United States Patent Office 3,594,412
Patented July 20, 1971

3,594,412
PROCESS FOR THE PREPARATION OF SURFACE-ACTIVE DERIVATIVES OF 5 - SULFOISO-PHTHALIC ACID
Rudolf Burkhardt, Witten (Ruhr), Germany, assignor to Dynamit Nobel Aktiengesellschaft, Troisdorf (Berizt Cologne), Germany
No Drawing. Continuation of application Ser. No. 704,990, Feb. 13, 1968, which is a continuation-in-part of application Ser. No. 367,200, May 13, 1964. This application June 9, 1970, Ser. No. 44,861
Int. Cl. C07c 143/52
U.S. Cl. 200—507        2 Claims

ABSTRACT OF THE DISCLOSURE

Surface-active ester and amide salts of 5-sulfoisophthalic acid are prepared by reacting an alkali or alkaline earth metal salt of 5-sulfoisophthalic acid dimethyl ester with an alcohol or an amine having 4 to 12 carbon atoms in the alkyl group to produce the desired dialkyl ester and dialkyl amide salts, respectively, of 5-sulfoisophthalic acid.

This application is a continuation of copending application Ser. No. 704,990, filed on Feb. 13, 1968, now abandoned, which in turn is a continuation-in-part of copending application Ser. No. 367,200, filed on May 13, 1964, now abandoned.

This invention relates to surface active ester and amide salts of 5-sulfoisophthalic acid.

Salts of esters of aromatic sulfodicarboxylic acids have been proposed as surface-active aids for use in the textile and leather industries. In the preparation of such products, phthalic acid anhydride was used as the starting material virtually exclusively as it is more easily obtainable than other aromatic dicarboxylic acids and it can, moreover, be sulfonated considerably more easily than iso- and terephthalic acid, for example. In the known process for the preparation of surface-active alkali and alkaline-earth metal salts of 4-sulfophthalic acid dialkyl esters, and despite the aforementioned advantage, the necessary 4-sulfophthalic acid, or anhydride thereof, is obtained by sulfonation of phthalic acid anhydride with the highly reactive sulfur trioxide. While losses in yield, which may occur, for example, after the sulfonation with oleum when separating the extremely easily water-soluble sulfophthalic acid by diluting the sulfonation mixture with water, may be effectively avoided by the use of this sulfonation method, which is difficult with respect to the procedural aspects thereof, a complete separation of the excess sulfonation agent from the sulfonic acid, which is actually to be expected because of the volatility of the sulfur trioxide, cannot be achieved. The residue of the sulfur trioxide which is persistently retained by the sulfophthalic acid leads to the formation of undesirable by-products during reaction with aliphatic alcohols, which occurs as the process continues, and during the neutralization of the resulting sulfophthalic acid esters.

No publications concerning the preparation and use of surface-active salts of dialkyl amides of aromatic sulfodicarboxylic acids have been published previously.

It has now been found, in accordance with the present invention, that surface-active salts of esters and amides of 5-sulfoisophthalic acid may be obtained by reacting alkali or alkaline earth metal salts of 5-sulfoisophthalic acid dimethyl ester at an elevated temperature with alcohols or amines, preferably aliphatic and containing at least 4 carbon atoms in the alkyl residue, to form the salts of the corresponding 5-sulfoisophthalic acid dialkyl esters or dialkyl amides, respectively.

Due to the lower solubility thereof in water and dilute sulfuric acid, as compared to 4-sulfophthalic acid, 5-sulfoisophthalic acid may be separated from a sulfonation mixture with a yield of over 90 percent by the addition of water. It is thereby precipitated as an almost colorless substance containing only a small residue of dilute sulfuric acid after separation by filtration or centrifuging. The crude sulfonic acid is dissolved in methanol and the two carboxyl groups thereof are esterified by heating the solution. The azeotropic removal of water during the esterification, for example, using benzene as an azeotroping agent, which is customary in other processes for the preparation of the 5-sulfoisophthalic acid dimethyl ester, is here dispensed with because the esterification proceeds practically completely in the absence thereof. This simplification results in a saving of both time and equipment. The methanolic solution is then neutralized, while cooling, with the amount of an alkali or alkaline-earth metal oxide, -hydroxide, or -carbonate which was calculated on the basis of the acid number. Insofar as these bases are soluble in water or methanol, they are preferably added in the form of the solutions thereof, otherwise they are added as methanolic or aqueous-methanolic suspensions. During the neutralization, the salts of the 5-sulfoisophthalic acid dimethyl ester are formed, which are sparingly soluble in cold methanol and from which the small amount of metal sulfates formed from the small sulfuric acid residue may be easily separated because of the different solubilities thereof. Thus, for example, the ester salts of lithium, calcium and strontium which are soluble in hot methanol go into solution when the neutralization mixture is heated, whereas the sulfates remain undissolved and can be filtered off. The ester salts of sodium and potassium may be freed from the sulfate by washing with water or by recrystallizing from water. The barium salt may also be recrystallized from water but can be obtained sulfate-free more easily by interrupting the neutralization after the addition of an amount of a barium-containing base which is sufficient for bonding the sulfuric acid, then filtering off the barium sulfate and subsequently further neutralizing the filtrate.

The pure salts of the 5-sulfoisophthalic acid dimethyl ester which are dried at elevated temperature are reacted to form the surface-active salts of the corresponding dialkyl esters and dialkyl amines of 5-sulfoisophthalic acid by heating with alcohols and amines, respectively, the alkyl residues of which contain at least 4 carbon atoms and which may be saturated or unsaturated, straight-chain, branched-chain or cyclic and which are preferably aliphatic. The transesterification of the salts of the dimethyl ester may be accelerated by using an excess of the alcohol and by the addition of transesterification catalysts. After the reaction, which is effected at a temperature in the range of 150° to 210° C. and at the boiling point of the alcohol, respectively, the excess alcohol is distilled off, under reduced pressure in the case of high-boiling alcohols: If desired, the excess alcohol may also be distilled off azeotropically with the use of aromatic hydrocarbons.

Amidation takes place in a similar manner, but catalysts are not required therefor. An excess of the amine is also advantageous but should be avoided when using very high-boiling or decomposable amines. The reaction with low-boiling amines may be accelerated by the addition of a solvent having a higher boiling point, for example, xylene. The further progress of the reactions, both the transesterification and the amidation, may be recognized by the gradual dissolution of the salts of the 5-sulfoisophthalic acid dimethyl ester, or from the amount of methanol which is distilled off.

The properties of the salts of the dialkyl esters and amides, respectively, of 5-sulfoisophthalic acid which are prepared in accordance with the present invention are influenced by the number and arrangement of the carbon atoms in the alkyl residue, by the kind of the metal cations and by the presence of the ester or amide bond. By means of a corresponding structural arrangement of the compounds, their properties may therefore be largely matched or coordinated with regard to the respective field of use, for example, the compounds prepared by the process of the present invention are useful as emulsifiers for oil-in-water and water-in-oil emulsions, as dispersing agents for aqueous and non-aqueous systems, and as wetting and purifying agents for the most diversified applications.

The invention will be further illustrated by reference to the following specific examples, but it is not intended to limit the same thereto.

EXAMPLE I

The sodium salt of 5-sulfoisophathalic acid dimethyl ester is heated to the point of gentle boiling with a 1.5-fold quantity by weight of 2-ethylhexanol and 8 g. of tetrabutyl titanate; the resulting methanol is distilled off overhead. When the salt has completely gone into solution, the excess 2-ethylhexanol is distilled off in vacuo. The sodium salt of 5-sulfoisophthalic acid di-(2-ethylhexyl)-ester is obtained as a brittle, yellowish mass. Based upon the amount of the dimethyl ester salt used, the yield is quantitative. The product is soluble both in water and in most organic solvents.

EXAMPLE II

The sodium salt of 5-sulfoisophthalic acid-di-n-octyl ester is prepared in a manner analogous to the procedure of Example I. It appears the same as the salt of the di-(2-ethylhexyl)-ester but is less easily soluble in water.

The great reduction of surface tension and the good wetting effect of the compounds prepared according to Examples I and II are apparent from the following tables.

TABLE 1

[Surface tension at 20° C. in dynes/cm. (distilled water=72.6 dynes/cm.)]

| Concentration in g./l. | Sodium salt of the 5-sulfo-isophthalic acid di-(2-ethyl-hexyl)-ester | Di-n-octyl ester |
|---|---|---|
| 0.5 | 30.0 | 28.8 |
| 0.1 | 30.2 | 29.1 |
| 0.01 | 30.6 | 31.6 |
| 0.003 | 43.0 | 42.0 |

TABLE 2

[Wetting effect according to DIN 53 901 with cotton standard material, sinking time in seconds at 25° C.]

| Concentration in g./l. | Sodium salt of the 5-sulfo-isophthalic acid di-(2-ethyl-hexyl)-ester | Di-n-octyl ester |
|---|---|---|
| 1.0 | 15 | 29 |
| 0.75 | 23 | 40 |
| 0.5 | 46 | 64 |

EXAMPLE III 100 g. of the calcium salt of 5-sulfoisophthalic acid dimethyl ester is boiled with 200 g. of n-butylamine and 600 ml. of xylene for three hours while refluxing, and the methanol, excess butylamine and about one-third of the xylene are distilled off overhead from a short column. After cooling, the reaction mixture is suction-filtered and the filter residue is washed with benzene and dried. 120 g. of the calcium salt of 5-sulfoisophthalic acid di-n-butylamide is obtained as a white powder which dissolves in water to form a yellowish, slightly foaming solution. It is sparingly soluble in organic solvents.

Analysis shows 7.4 percent N and 8.5 percent S (calculated=7.47 percent N and 8.32 percent S).

The invention being thus described, it will be obvious that the same may be varied in many ways. Such variations are not to be regarded as a departure from the spirit and scope of the invention and all such modifications are intended to be included within the scope of the following claims.

I claim:
1. An alkali metal or alkaline earth metal salt of a compound having the general formula

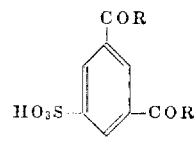

wherein R is alkylamino having from 4 to 12 carbon atoms.

2. Calcium N,N'-di-n-butyl-5-sulfoisophthalamide.

References Cited

UNITED STATES PATENTS 3,088,956   5/1963   Horn et al.
3,135,787   6/1964   Burkhardt.

FOREIGN PATENTS 1,177,629   9/1964   Germany.

DANIEL D. HORWITZ, Primary Examiner

U.S. Cl. X.R.

260—470; 252—8.57, 8.75, 354; 117—142, 143